United States Patent
Hellstrom et al.

[11] Patent Number: 5,479,720
[45] Date of Patent: Jan. 2, 1996

[54] METHODS AND APPARATUS FOR MEASURING WEB THICKNESS AND OTHER CHARACTERISTICS OF A MOVING WEB

[75] Inventors: Ake A. Hellstrom, Columbus; Karsten G. Koester, Plain City; Thomas A. Frisco, Columbus; James E. Throm, Jr., Galloway, all of Ohio

[73] Assignee: ABB Industrial Systems, Inc., Columbus, Ohio

[21] Appl. No.: 186,047

[22] Filed: Jan. 21, 1994

[51] Int. Cl.$^6$ ................................................. G01B 7/06
[52] U.S. Cl. ................................. 33/501.02; 33/501.03; 33/783
[58] Field of Search ........................... 33/501.02, 501.03, 33/783, 732, 733, 834, 835, DIG. 1, DIG. 2, 556, 560, 561; 73/37.7; 324/229, 231, 236, 237, 238; 162/263, 49, 198

[56] References Cited

U.S. PATENT DOCUMENTS

| | | | |
|---|---|---|---|
| 3,855,524 | 12/1974 | Crawford | 324/231 |
| 4,292,838 | 10/1981 | Larsen | 73/37.7 |
| 4,434,649 | 3/1984 | Williams | 324/229 |
| 4,449,398 | 5/1984 | Williams | 73/37.7 |
| 4,450,404 | 5/1984 | Williams et al. | 324/229 |
| 4,776,695 | 10/1988 | van Pham et al. . | |
| 4,791,353 | 12/1988 | Typpo . | |
| 4,791,367 | 12/1988 | Typpo | 324/229 |
| 4,864,851 | 9/1989 | Houghton | 162/263 |
| 4,866,984 | 9/1989 | Houghton . | |
| 4,877,485 | 10/1989 | Carson | 162/263 |
| 4,901,445 | 2/1990 | Boissevain et al. | 33/501.02 |
| 4,971,353 | 11/1990 | Buma et al. . | |
| 4,991,432 | 2/1991 | Houghton et al. . | |
| 5,013,403 | 5/1991 | Chase | 162/198 |
| 5,042,160 | 8/1991 | Kasten et al. | 33/501.02 |
| 5,063,682 | 11/1991 | Boissevain et al. | 33/501.02 |
| 5,074,050 | 12/1991 | Williams | 33/501.03 |
| 5,075,979 | 12/1991 | Foskett | 33/501.02 |
| 5,092,678 | 3/1992 | Chase et al. . | |
| 5,104,488 | 4/1992 | Chase | 162/198 |
| 5,111,592 | 5/1992 | Aehnelt et al. | 33/561 |
| 5,111,688 | 5/1992 | Houghton et al. . | |
| 5,132,619 | 7/1992 | Typpo | 324/231 |
| 5,138,878 | 8/1992 | Cresson et al. . | |
| 5,163,365 | 11/1992 | Taylor . | |
| 5,171,403 | 12/1992 | Chase et al. | 162/198 |
| 5,226,239 | 7/1993 | Boissevain et al. | 33/501.02 |
| 5,233,195 | 8/1993 | Hellstrom et al. . | |
| 5,243,849 | 9/1993 | Williams | 73/37.7 |
| 5,355,589 | 10/1994 | Madlener et al. | 33/556 |

OTHER PUBLICATIONS

Literature—"Digital Caliper and Density Sensor 2213", Measurex Corporation, Cupertino, California (No Date).
Literature—"Calitel HS Caliper Sensor", #8827, Valmet Automation (No Date).
General Specifications for B/M7000XL Caliper Sensor, Yokogawa, Japan (No Date).
Literature—Honeywell Lippke 6106–Caliper Sensor DM SH–V (No Date).
Literature—"The Advantage Line Process Management System" for Models 4406, 4407, 4410LT, 4203/4163/4168, Impact Systems, San Jose, Calif. (No Date).

*Primary Examiner*—Christopher W. Fulton
*Attorney, Agent, or Firm*—Killworth, Gottman, Hagan & Schaeff

[57] ABSTRACT

A caliper measuring system is provided for determining the thickness of a moving sheet. The system comprises first and second caliper sensing heads having first and second sensing shoes positioned on opposite sides of the moving sheet for engaging the sheet. A gap sensor is associated with the first and second sensing shoes for generating distance signals representative of the distance between the first and second sensing shoes and for determining the thickness of the moving sheet based upon the distance signals. The gap sensor includes a processor which determines the thickness of the moving sheet from the distance signals, generates a count of lumps sensed in the moving web, and generates a baring profile representative of rapid thickness variations along the moving sheet in the direction of movement of the sheet.

27 Claims, 10 Drawing Sheets

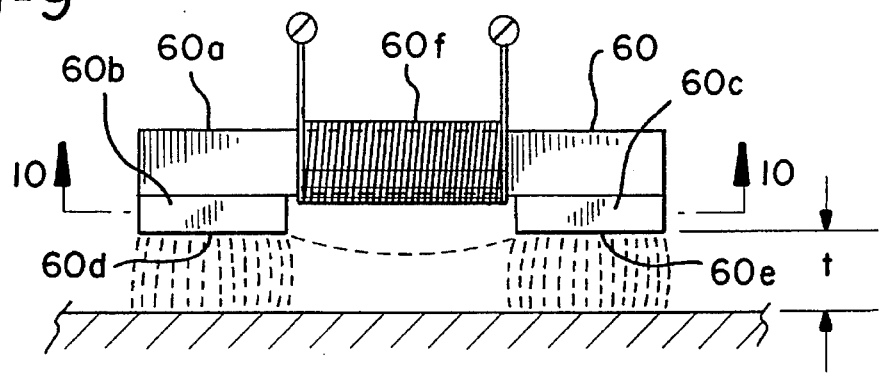
FIG-9
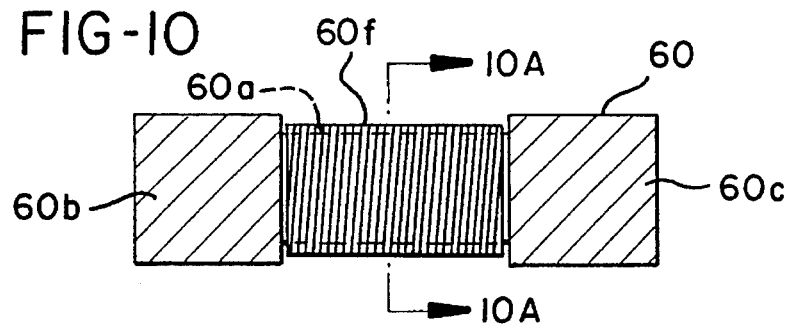
FIG-10
FIG-11
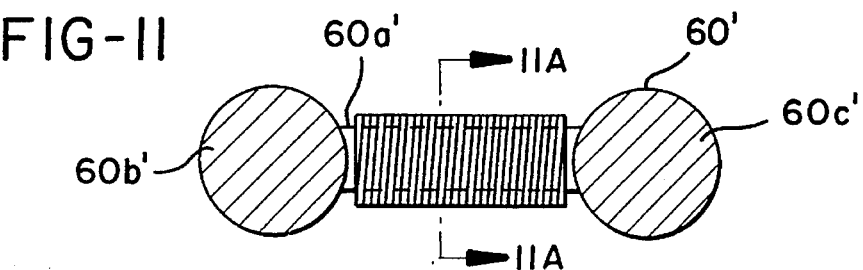
FIG-10A
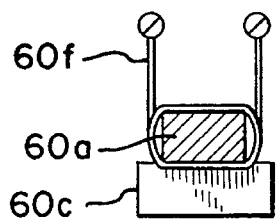
FIG-11A
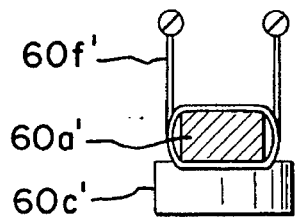

METHODS AND APPARATUS FOR MEASURING WEB THICKNESS AND OTHER CHARACTERISTICS OF A MOVING WEB

BACKGROUND OF THE INVENTION

The present invention relates generally to measuring characteristics of a web of moving sheet material and, more particularly, to improved methods and apparatus for measuring web thickness and other characteristics of a moving sheet of paper being manufactured by a paper making machine.

Systems for measuring characteristics of moving webs of material, such as paper webs, are well known in the art. For example, paper web thickness is commonly measured by scanning a measurement head transversely back and forth across a moving web. The measurement head includes contact shoes which engage opposite sides of the moving web. The distance between the shoes is measured and is directly related to the sheet thickness or "caliper."

While prior art web measuring apparatus have been effectively used for a substantial period of time, the requirements for the performance of these apparatus have been constantly increasing. For example, in the paper making industry, increased performance requirements have come about, at least in part, due to the following new industry trends: operating paper web making apparatus at higher speeds; producing thinner products to conserve materials, resulting in brittle sheets which are easily torn by contact sensors; use of recycled products that tend to deposit foreign matter on contact sensors; and, higher pulp utilization resulting in sheets having a greater quantity of small wood matter on their surfaces which can cause inaccuracies in thickness determinations and can result in torn sheets if caught by contact sensors.

In view of these new industry trends, there is a need for an improved measuring apparatus which is more accurate, has quicker overall system response time and is more readily useable with the thinner web sheets which are oftentimes manufactured from recycled materials and/or in compliance with higher pulp utilization requirements.

SUMMARY OF THE INVENTION

This need is met by the methods and apparatus of the present invention wherein web thickness and other characteristics of a moving sheet of material, such as paper being manufactured by a paper making machine, are measured using a number of improvements in the measuring art.

In accordance with a first aspect of the present invention, a sheet sensing shoe is provided and comprises a main body having first and second opposing, generally planar surfaces, first and second opposing ends and first and second opposing sides. The first planar surface is adapted to engage a moving sheet. The first end includes first and second faces which converge toward one another and share a common side.

The first and second faces are substantially planar. The first face intersects a first edge on the first surface at an obtuse angle and intersects a first edge on the second surface at an acute angle. The second face intersects a second edge on the first surface at an obtuse angle and intersects a second edge on the second surface at an acute angle. The first and second edges on the first surface converge at an angle of approximately 90°, and the first and second edges on the second surface converge at an angle of approximately 90°.

In accordance with a second aspect of the present invention, a sheet sensing shoe is provided and comprises a main body, an electromagnetic core including a yoke portion and first and second pole portions having respective distal ends which extend into the main body, and a sensing coil wound about the yoke portion. The first and second pole portions have respective transversely extending cross-sectional areas, each of which exceeds a transversely extending cross-sectional area of the yoke portion. The electromagnetic core is formed from ferrite. The main body is formed from boron carbide.

In accordance with a third aspect of the present invention, a sheet sensing shoe is provided and comprises a main body having at least one portion formed from boron carbide. A first sensing shoe constructed in accordance with the present invention comprises first and second layers of boron carbide and a layer of ferrite which is interposed between the first and second layers of boron carbide. A second sensing shoe constructed in accordance with the present invention is formed substantially from boron carbide.

In accordance with a fourth aspect of the present invention, a caliper sensing head is provided and comprises: an enclosure; a sensing shoe; and a sensing shoe connector and movement controller associated with the enclosure for flexibly supporting the sensing shoe and for effecting movement of the sensing shoe relative to a moving web. The sensing shoe connector and movement controller includes a shoe movement limiter for limiting the distance the sensing shoe moves in the direction toward the moving web.

The sensing shoe connector and movement controller further comprises: a housing having first and second chambers; a reciprocating piston positioned within the first chamber and having an orifice extending therethrough; a spring for biasing the piston in a direction away from the second chamber; a fluid supply connected to the housing for supplying pressurized fluid to the first chamber sufficient to effect movement of the piston against the spring in a direction toward the second chamber; a diaphragm extending across an opening in the housing for defining a flexible wall for enclosing the second chamber; and, an escape valve associated with the second chamber for permitting a limiting quantity of fluid to escape from the second chamber. The first chamber communicates with the second chamber via a bore extending between the first and second chambers. The second chamber receives pressurized fluid which passes through the piston via the orifice. The diaphragm acts upon the sensing shoe to effect movement of the sensing shoe relative to the moving web. The shoe movement limiter comprises a cable interposed between and connected to the diaphragm and the piston.

The fluid supply comprises: a fluid source; an input valve for selectively permitting fluid to flow from the fluid source into the first chamber; and a pressure transducer for sensing the pressure in the second chamber and generating pressure signals representative thereof.

In accordance with a fifth aspect of the present invention, a caliper sensing head is provided and comprises: an enclosure; a sensing shoe; and a sensing shoe connector and movement controller associated with the enclosure for flexibly supporting the sensing shoe and for effecting movement of the sensing shoe relative to a moving web. The sensing shoe connector and movement controller includes a diaphragm for acting upon the sensing shoe to effect movement of the sensing shoe relative to the moving web.

In accordance with a sixth aspect of the present invention, a caliper measuring system is provided for determining the thickness of a moving sheet. The system comprises first and second caliper sensing heads having first and second sensing shoes positioned on opposite sides of the moving sheet. The sensing shoes are adapted to engage the opposite sides of the moving sheet. A gap sensor is associated with the first and second sensing shoes for generating distance signals representative of the distance between the first and second sensing shoes and for determining the thickness of the moving sheet based upon the distance signals. The gap sensor includes an L-C oscillator for generating pulses of varying frequency, a frequency-to-voltage converter for converting frequency changes of the pulses into voltage signals, and a processor for receiving the voltage signals and processing the voltage signals to remove spikes resulting from the first and second sensing shoes engaging lumps in the moving sheet. The resulting processed voltage signals define the distance signals. The processor further determines the thickness of the moving sheet from the distance signals.

The gap sensor further comprises a filter for filtering noise from the voltage signals before the voltage signals are received by the processor.

The processor further counts the spikes to generate a count of lumps sensed in the moving web. The processor additionally generates a baring profile from the distance signals. The baring profile is representative of rapid thickness variations along the moving sheet in the direction of movement of the sheet. The processor generates the baring profile by determining and plotting a peak-to-peak difference for each of a plurality of data boxes. Each data box is defined by a plurality of distance signals. The processor determines the peak-to-peak difference for a given data box by identifying maximum and minimum distance signals within the given data box and then taking a difference between the identified maximum and minimum distance signals. The difference defines the peak-to-peak difference for the given data box.

Accordingly, it is an object of the present invention to provide improved methods and apparatus for measuring web characteristics. It is another object of the present invention to provide improved methods and apparatus for measuring web thickness and other characteristics of a moving sheet of paper being manufactured by a paper making machine. These and other objects and advantages will be apparent from the following description, the accompanying drawings and the appended claims.

BRIEF DESCRIPTION OF THE DRAWINGS

FIG. 9 is a side view of the electromagnetic core of the second sensing shoe;

FIG. 10 is a sectional view taken along line 10—10 in FIG. 9;

FIG. 10A is a sectional view taken along line 10A—10A in FIG. 10;

FIG. 11 is a bottom view partially in section of an electromagnetic core constructed in accordance with a second embodiment of the present invention;

FIG. 11A is a sectional view taken along line 11A—11A in FIG. 11;

DETAILED DESCRIPTION OF THE INVENTION

Figure 1:
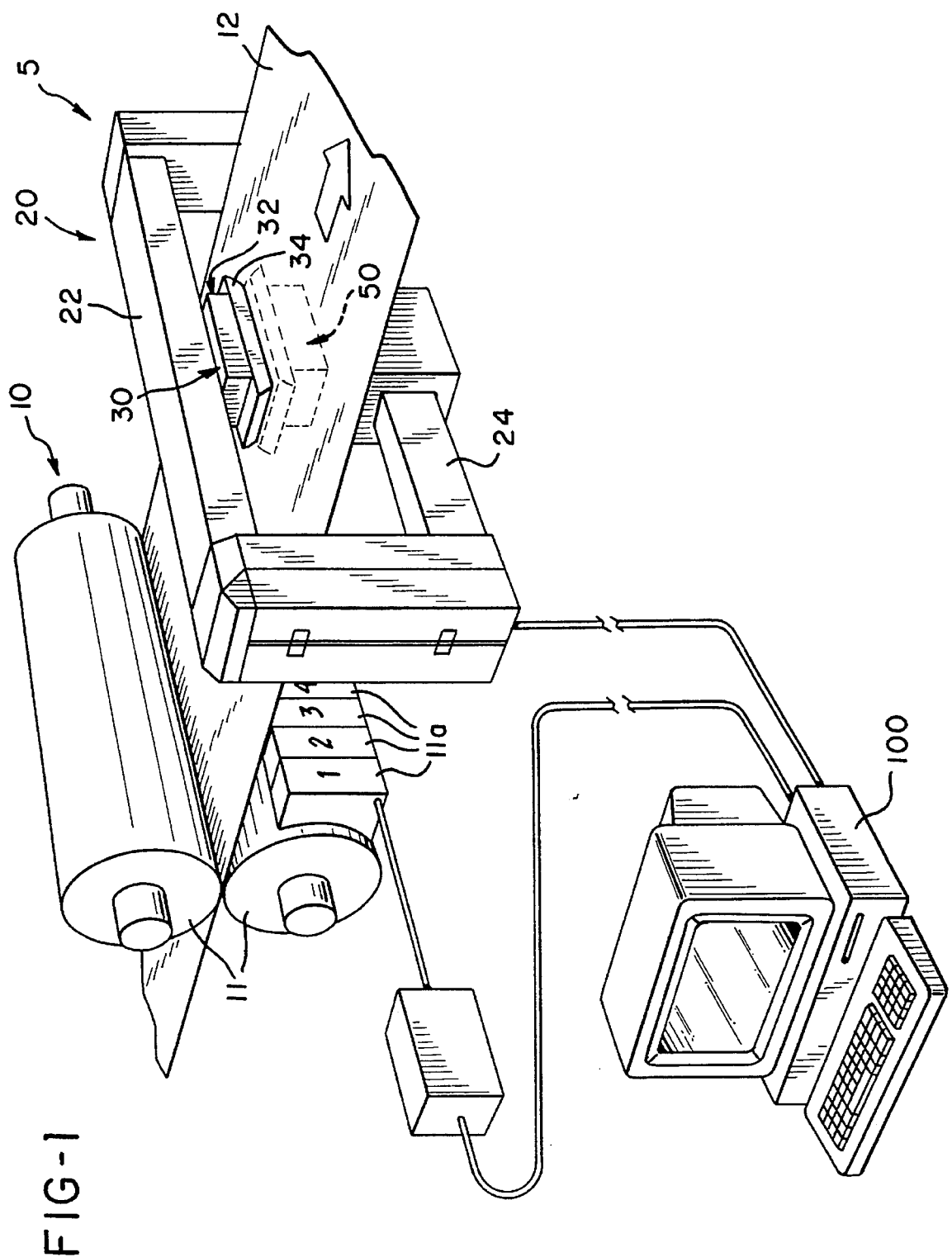
FIG. 1 illustrates a caliper measuring system constructed in accordance with the present invention positioned downstream from final calendering rolls of a conventional paper making machine.

FIG. 1 shows a conventional paper making machine 10 having final calendering rolls 11 and associated cross machine control actuators 11a. A caliper measuring system 5 constructed in accordance with the present invention is preferably positioned downstream from the final calendering rolls 11 and is advantageously used to monitor the thickness of a moving sheet of paper 12 after the final calendering operation. The measuring system 5 also provides a baring profile representative of rapid thickness variations along the moving sheet 12 in the direction of movement of the sheet 12, and a count of pulp lumps detecting in the moving sheet 12.

The caliper measuring system 5 includes a scanning station 20. The moving sheet of paper 12 can be seen passing through the scanning station 20 between upper and lower transverse beams 22 and 24 on which are mounted upper and lower caliper sensing heads 30 and 50. The sensing heads 30 and 50 are driven back and forth across the width of the paper 12 in a continuous scanning motion, keeping them in substantial alignment at all times.

Figure 2:
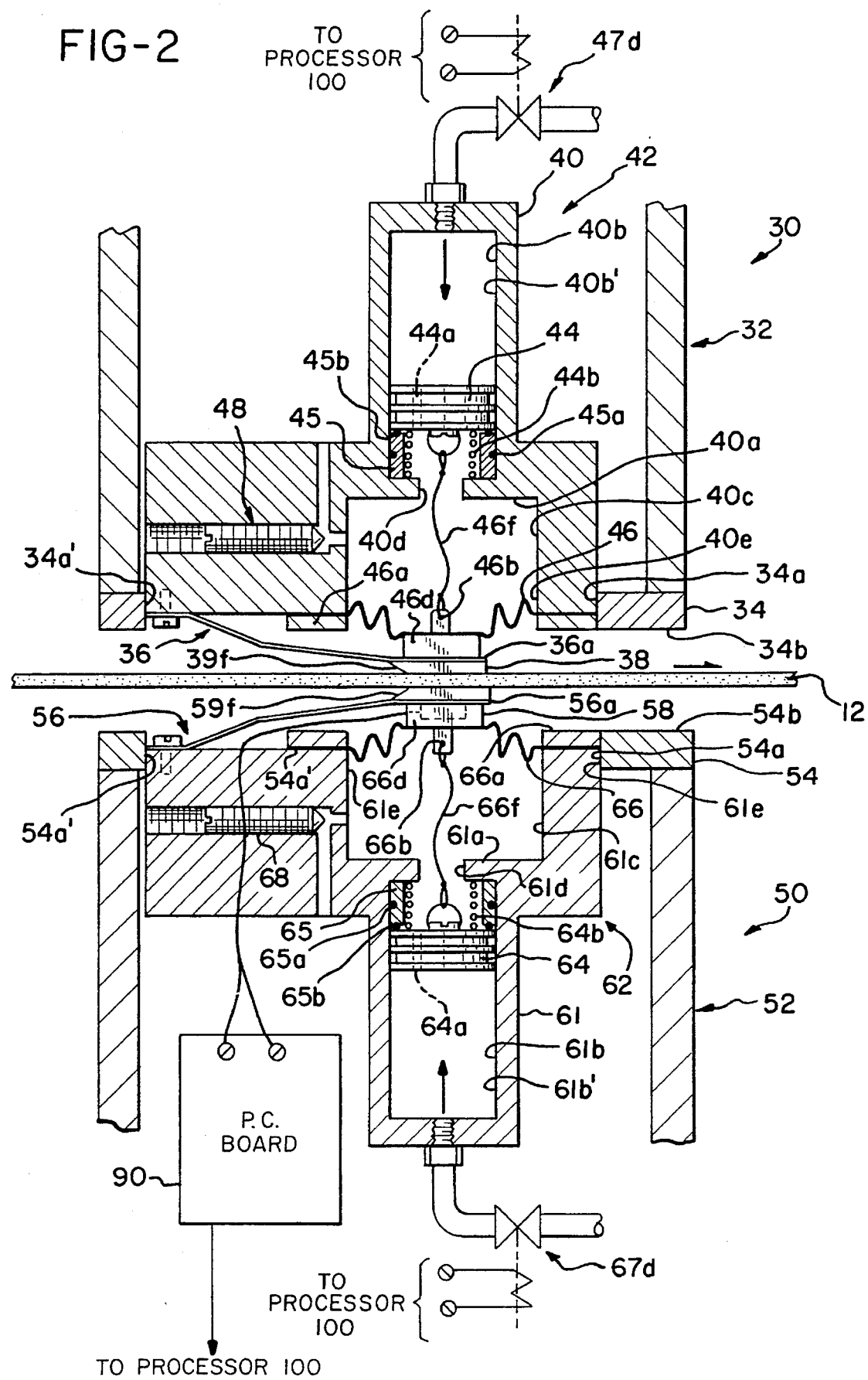
FIG. 2 is a schematic cross-sectional view of first and second caliper sensing heads of the caliper measuring system illustrated in FIG. 1.

The upper sensing head 30 includes an enclosure 32 having a removable base plate 34, see FIGS. 1 and 2. An opening 34a extends completely through the base plate 34. Fixedly secured to a perimetric edge 34a' of the plate 34 which defines the opening 34a is a housing 40. Fastened to the outer surface of the housing 40 is a flexible arm 36.

Preferably, the arm 36 is formed from a woven polymeric material, such as woven Kevlar (trademark). Attached to the end 36a of the arm 36 opposite the one fastened to the housing 40 is a first sensing shoe 38. The housing 40 forms part of a first sensing shoe connector and movement controller 42 which, as will be discussed hereinbelow, is operatively connected to the first sensing shoe 38 for effecting movement of the first sensing shoe 38 relative to the moving sheet of paper 12.

Figure 6:
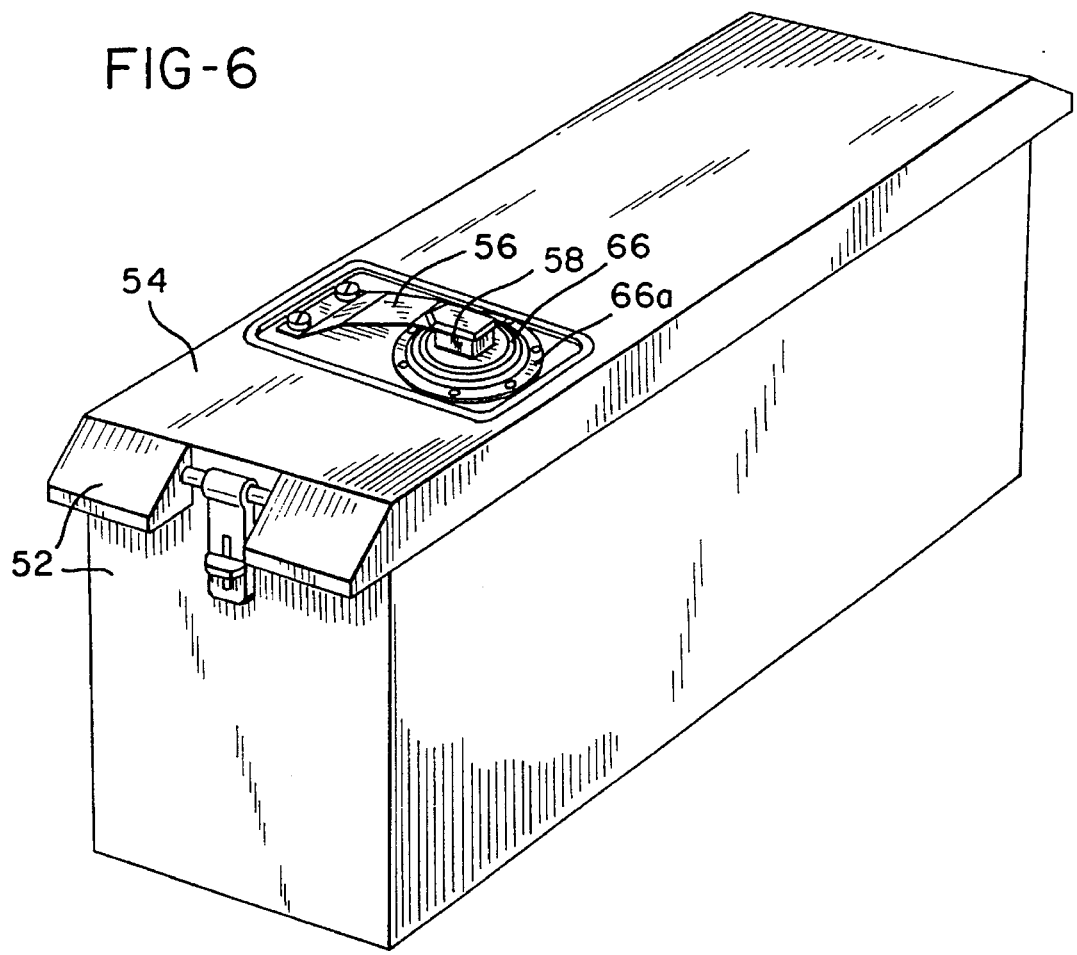
FIG. 6 is a perspective view of the second sensing head shown in FIG. 1.

The lower sensing head 50 includes an enclosure 52 having a removable base plate 54, see FIGS. 2 and 6. An opening 54a extends completely through the base plate 54. Fixedly secured to a perimetric edge 54a' of the plate 54 which defines the opening 54a is a housing 61. Fastened to the outer surface of the housing 61 is a flexible arm 56 which, preferably, is formed from the same material as arm 36. Attached to the end 56a of the arm 56 opposite the one fastened to the housing 61 is a second sensing shoe 58. The housing 61 forms part of a second sensing shoe connector and movement controller 62 which, as will be discussed hereinbelow, is operatively connected to the second sensing shoe 58 for effecting movement of the second sensing shoe 58 relative to the moving sheet of paper 12.

Figure 3:
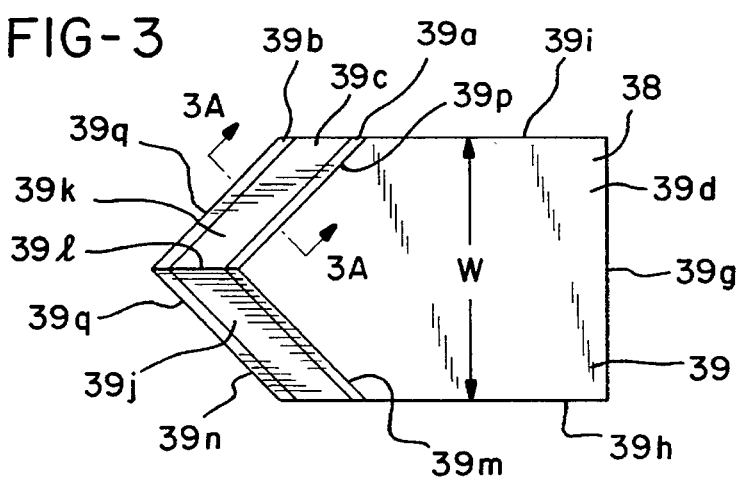
FIG. 3 is a plan view of a first side of a first sensing shoe of the first sensing head.
Figure 3A:
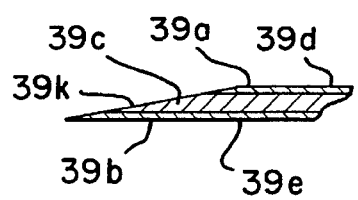
FIG. 3A is a sectional view taken along line 3A—3A in FIG. 3.
Figure 4:
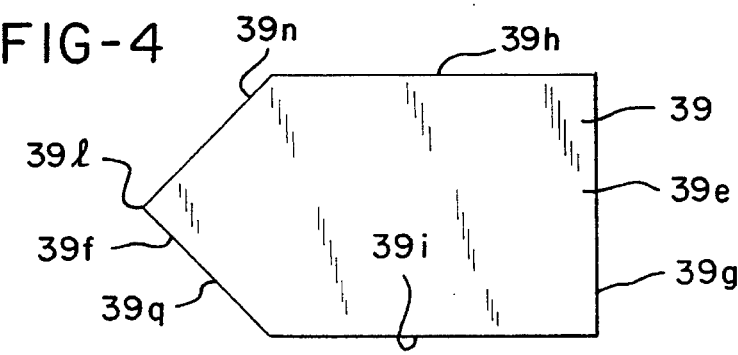
FIG. 4 is a plan view of a second side of the first sensing shoe illustrated in FIG. 3.

The first sensing shoe 38 comprises a main body 39 formed preferably from first and second layers of boron carbide 39a and 39b and an intermediate layer of ferrite 39c, a magnetically susceptible material, see FIGS. 3 and 4. The boron carbide layers 39a and 39b, which provide substantial mechanical strength and wear resistance, are bonded by conventional adhesive to the ferrite layer 39c. After bonding, the main body 39 is ground and polished, with particular care to maintain a uniform thickness of the boron carbide layer 39a.

The main body 39 includes first and second opposing, generally planar surfaces 39d and 39e, first and second opposing ends 39f and 39g and first and second opposing sides 39h and 39i. The first planar surface 39d is positioned nearest the moving sheet 12 and may, for example, have a width W=15 mm. The first end 39f includes first and second substantially planar faces 39j and 39k which converge toward one another and share a common side 39l. The first face 39j intersects a first edge 39m on the first surface 39d at an obtuse angle and intersects a first edge 39n on the second surface 39e at an acute angle, e.g., approximately 3°–5°. The second face 39k intersects a second edge 39p on the first surface 39d at an obtuse angle and intersects a second edge 39q on the second surface 39e at an acute angle, e.g., approximately 3°–5°. The first and second edges 39m and 39p on the first surface converge at an angle of approximately 90°, and the first and second edges 39n and 39q on the second surface 39e converge at an angle of approximately 90°.

Figure 7:
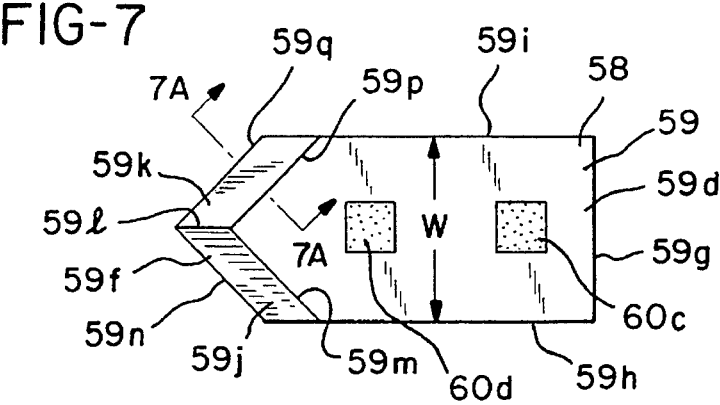
FIG. 7 is a plan view of a first side of the second sensing shoe.
Figure 7A:
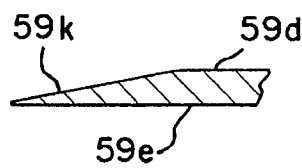
FIG. 7A is a sectional view taken along line 7A—7A in FIG. 7.
Figure 8:
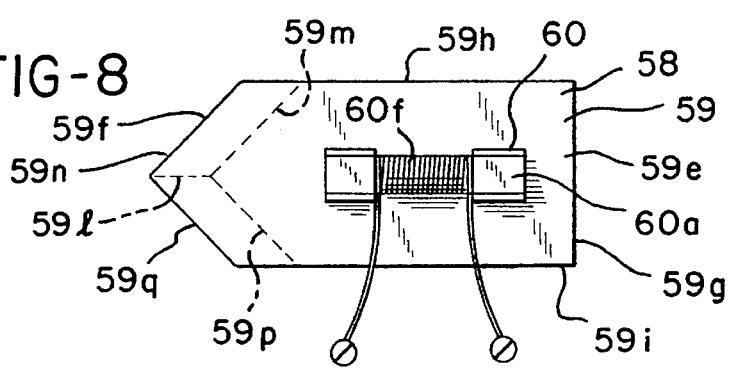
FIG. 8 is a plan view of a second side of the second sensing shoe illustrated in FIG. 7.
Figure 5:
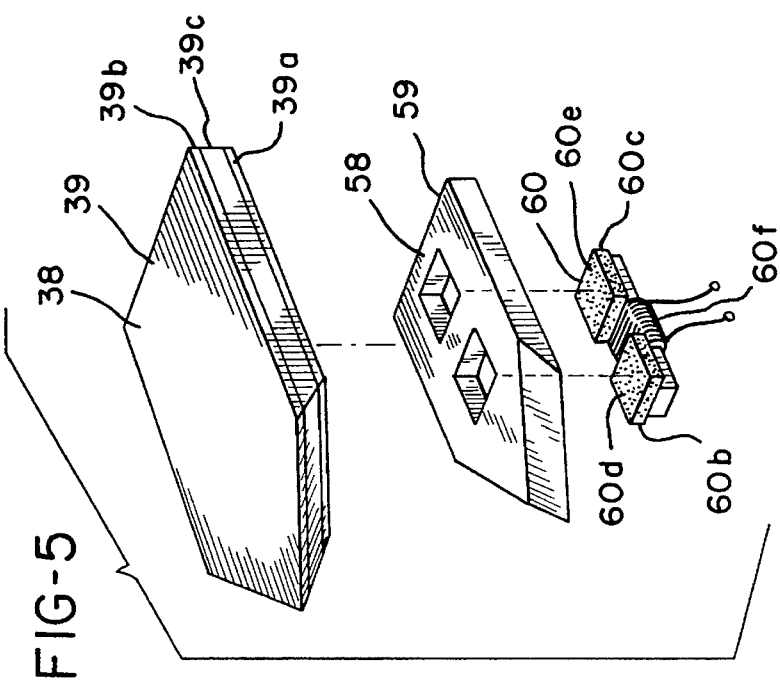
FIG. 5 is a perspective view showing the first and second sensing shoes, with the electromagnetic core and its associated sensing coil broken-away from the second sensing shoe.

The second sensing shoe 58 comprises a main body 59 formed preferably from boron carbide, which has been ground and polished, see FIGS. 5, 7 and 8. The main body 59 includes first and second opposing, generally planar surfaces 59d and 59e, first and second opposing ends 59f and 59g and first and second opposing sides 59h and 59i. The first planar surface 59d is positioned nearest the moving sheet 12 and may, for example, have a width W=10 mm. The first end 59f includes first and second substantially planar faces 59j and 59k which converge toward one another and share a common side 59l. The first face 59j intersects a first edge 59m on the first surface 59d at an obtuse angle and intersects a first edge 59n on the second surface 59e at an acute angle, e.g., approximately 3°–5°. The second face 59k intersects a second edge 59p on the first surface 59d at an obtuse angle and intersects a second edge 59q on the second surface 59e at an acute angle, e.g., approximately 3°–5°. The first and second edges 59m and 59p on the first surface converge at an angle of approximately 90°, and the first and second edges 59n and 59q on the second surface 59e converge at an angle of approximately 90°.

Figure 16:
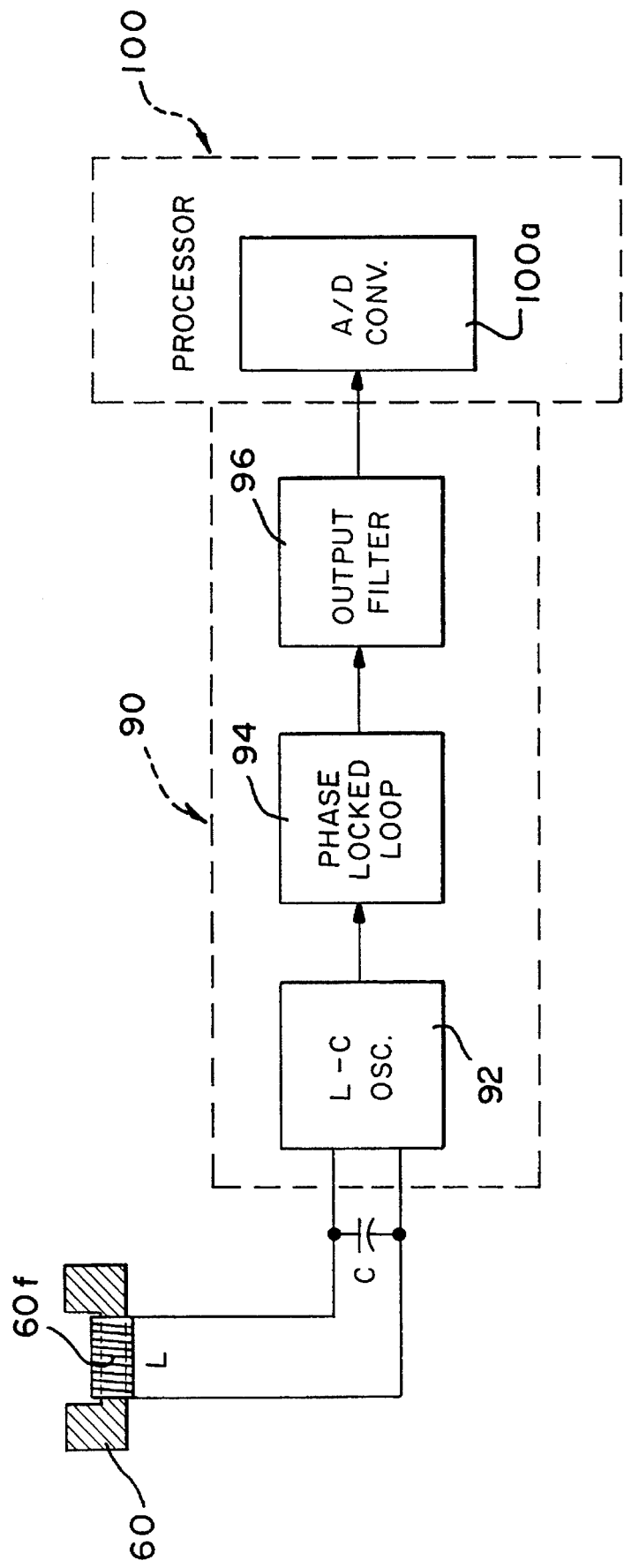
FIG. 16 is a schematic block diagram of the sensing circuit of the present invention.

The second sensing shoe 58 further includes an electromagnetic core 60 which comprises a yoke portion 60a and first and second pole portions 60b and 60c, see FIGS. 5, 7–10 and 10A. As best shown in FIGS. 10 and 10A, each of the pole portions 60b and 60c has a transversely extending square-shaped cross section having an area that exceeds the area of a transversely extending rectangular-shaped cross section of the yoke portion 60a. This particular core shape is believed to enhance gap measurement by reducing stray inductance. Respective distal ends 60d and 60e of the pole portions 60b and 60c extend through the main body 59 and are coplanar with the first surface 59d, see FIG. 7. A sensing coil 60f is wound about the yoke portion 60a and connects with a sensing circuit 90 which, in turn, is connected to a system control processor 100, see FIG. 16. The electromagnetic core 60 is formed from ferrite.

An alternative embodiment of the core 60' is illustrated in FIGS. 11 and 11A. In that embodiment, each of the pole portions 60b' and 60c' is provided with a transversely extending circular-shaped cross section having an area which exceeds the area of a transversely extending cross section of the yoke portion 60a'.

As noted above, the first and second layers 39a and 39b of the first sensing shoe 38 and the main body 59 of the second sensing shoe 58 preferably are formed from boron carbide. Boron carbide is preferred because: it is resistant to wear; it has a low coefficient of kinetic friction which allows a sheet of paper to move across the planar surfaces 39d and 59d with minimal resistance; it is lightweight; and, it is somewhat electrically conductive and, thus, is capable of dissipating static charges from a moving sheet of paper to reduce dirt attraction to the planar surfaces 39d and 59d. While boron carbide is used in the preferred embodiment, other materials having like characteristics may also be employed.

For very demanding applications, the planar surfaces 39d and 59d and the first and second surfaces 39j, 39k, 59j and 59k may be modified by ion implantation to increase their resistance to wear. Alternatively, diamond films may be applied to the surfaces 39d, 59d, 39j, 39k, 59j and 59k.

Figure 12:
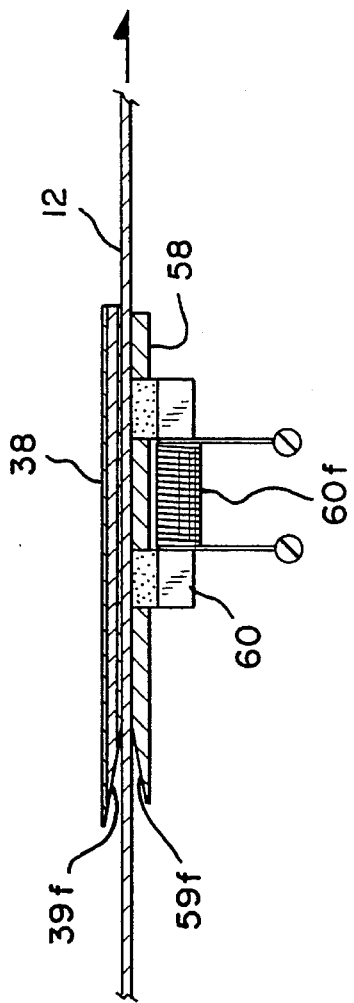
FIG. 12 is a sectional view of the first and second sensing shoes positioned on opposite sides of a moving sheet of paper.
Figure 13:
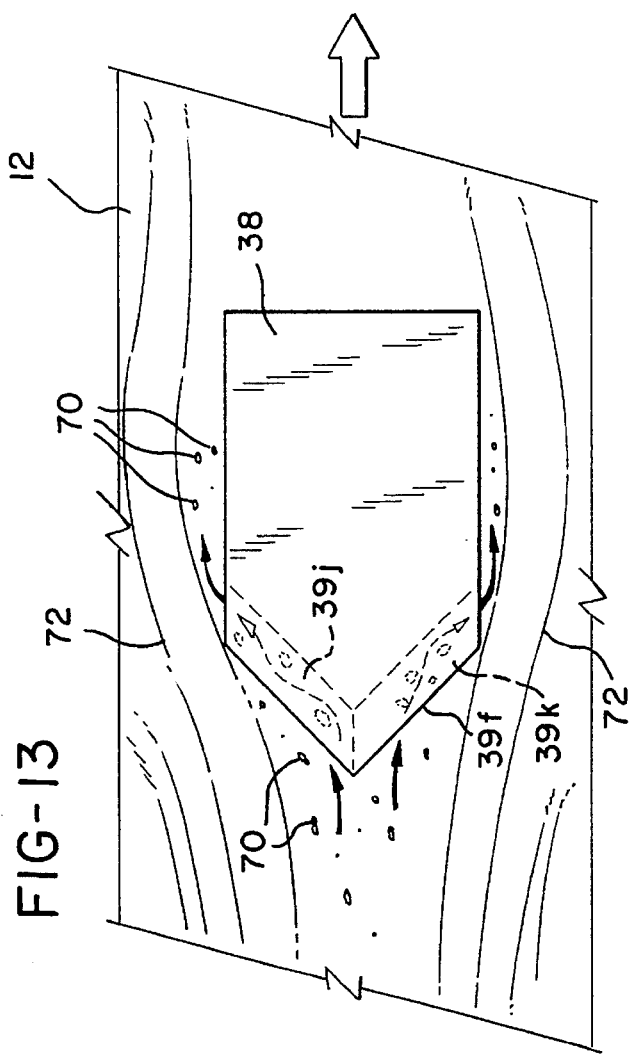
FIG. 13 is a plan view illustrating the first sensing shoe contacting a moving sheet of paper.

The first ends 39f and 59f of the first and second sensing shoes 38 and 58 have angled V-shapes which are defined by their respective first and second planar faces 39j, 39k and 59j, 59k, see FIG. 5. As shown in FIGS. 2 and 12, the first ends 39f and 59f point toward the incoming sheet of paper 12. The first ends 39f and 59f act to push aside dust, dirt and like particles 70 which are carried by the moving sheet of paper 12, see FIG. 13. Thus, an unacceptable quantity of particles 70 is prevented from contacting the planar surfaces 39d and 59d of the first and second shoes 38 and 58, resulting in reduced foreign matter buildup on the planar surfaces 39d and 59d. The first ends 39f and 59f also act to smooth out wrinkles 72 formed in the moving sheet 12, which, if allowed to pass between the sensing shoes 38 and 58, would produce erroneous paper thickness readings. The first ends 39f and 59f additionally act to deflect air that travels with the moving sheet of paper 12, which is particularly advantageous during high speed applications where a boundary air layer can lift the sensing shoes.

As is clear from a comparison of FIGS. 3 and 7, the width of the first sensing shoe 38 is greater than the width of the second sensing shoe 58. The second sensing shoe 58 is constructed as narrow as possible to allow it to better handle wrinkles 72 in the web 12, see FIG. 13. The first sensing shoe 38 is slightly wider than the second shoe 58 to accommodate possible sensing head misalignment.

As noted previously, the first sensing shoe movement controller 42 effects movement of the first sensing shoe 38 relative to the moving sheet of paper 12. The housing 40 of the controller 42 is fixedly secured to the base plate 34 of the enclosure 32, see FIG. 2. The housing 40 includes a protruding inner portion 40a which separates first and second inner chambers 40b and 40c from one another. The first chamber 40b communicates with the second chamber 40c via a bore 40d extending through the inner portion 40a.

A piston 44 is positioned within the first chamber 40b for reciprocating movement therein. An orifice 44a extends through the piston 44 to permit fluid to pass therethrough. A stop member 45 is interposed between the piston 44 and the inner portion 40a for limiting the distance the piston 44 can travel toward the second chamber 40c. A first seal 45a seals the stop member 45 to the inner wall 40b' of the first chamber 40b. A second seal 45b seals the stop member 45 to the piston 44 when the piston 44 is in its lowermost position. A spring 44b is also interposed between the inner portion 40a and the piston 44 for biasing the piston 44 in a direction away from the second chamber 40c.

A diaphragm 46 extends across an opening 40e in the housing 40 for defining a flexible wall for enclosing the second chamber 40c. The diaphragm 46 is secured in position via a ring plate 46a.

Figure 15:
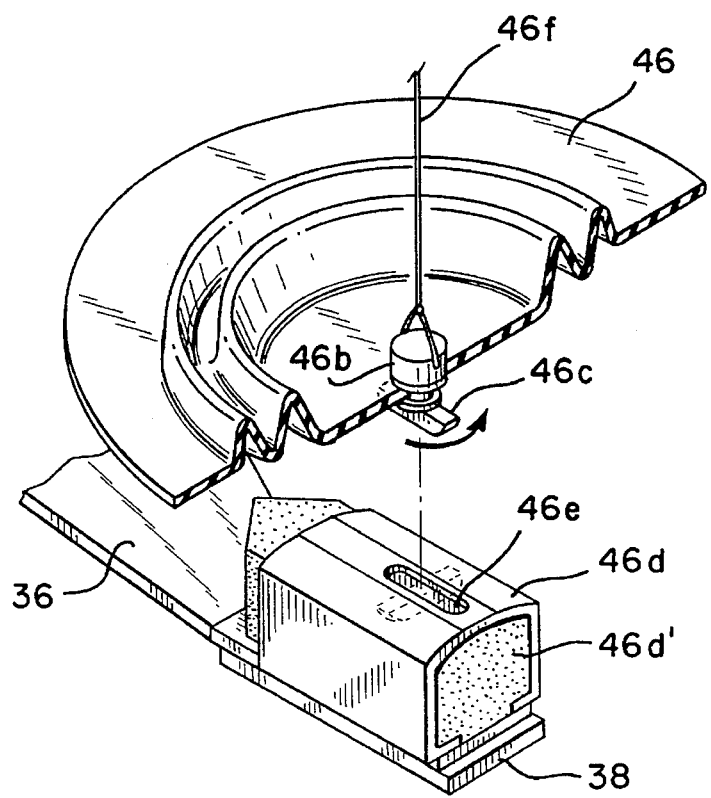
FIG. 15 is a perspective view of the diaphragm, rotatable connector, lightweight channel and first sensing shoe of the first sensing head.

Associated with the diaphragm 46 is a rotatable polymeric connector 46b having a lower locking member 46c, see FIG. 15. A lightweight channel 46d having an upper slot 46e is fixedly connected to the sensing shoe 38. The lightweight channel 46d is filled with foam rubber 46d'. The lower locking member 46c passes through the slot 46e in the lightweight channel 46d and, upon rotation of the connector 46b, locks the sensing shoe 38 to the diaphragm 46.

Figure 14:
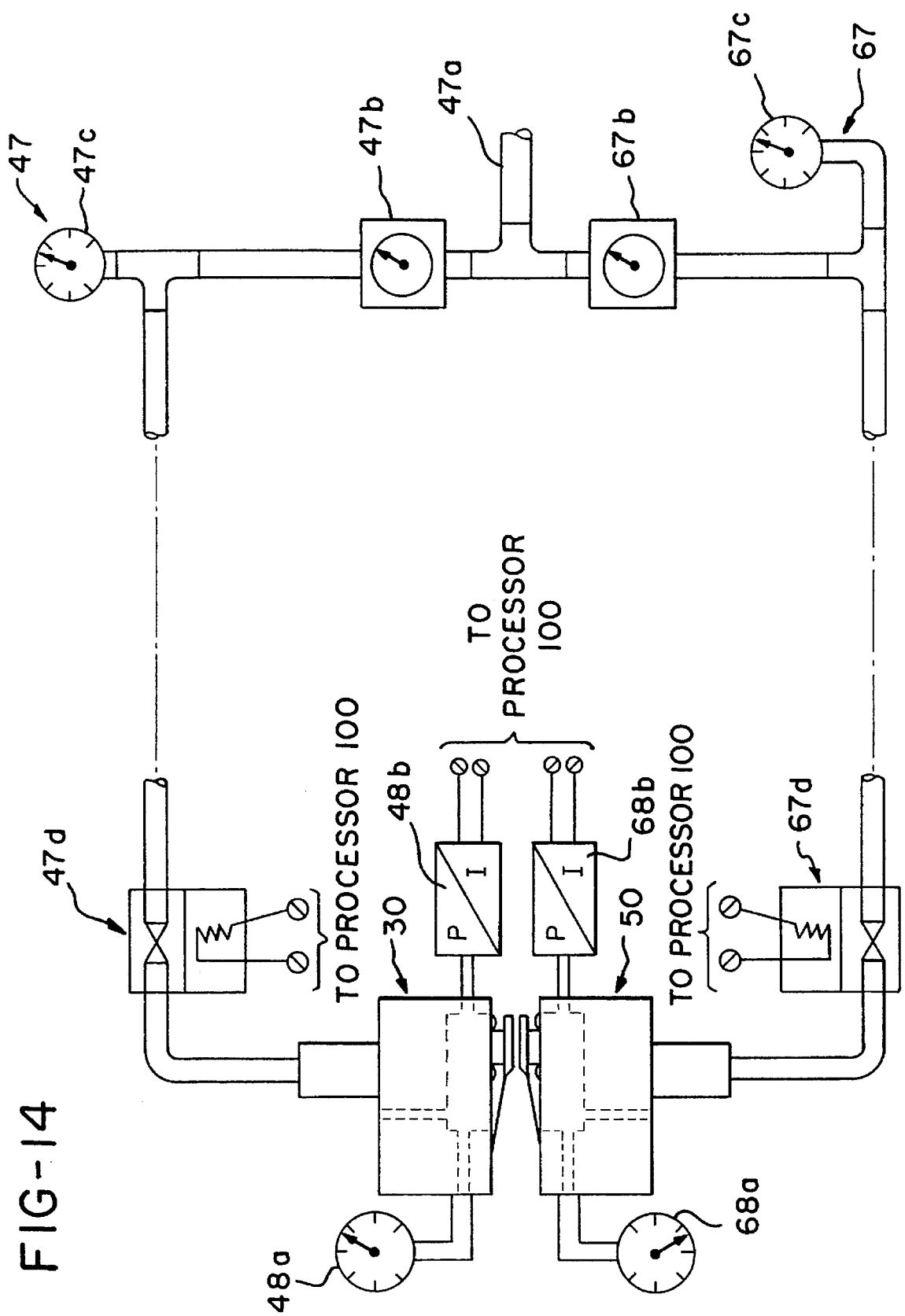
FIG. 14 is a schematic view of the first and second sensing heads, a fluid supply and first and second pressure gauges.

A fluid supply 47 is connected to the housing 40 for supplying pressurized fluid, air in the illustrated embodiment, to the first chamber 40b sufficient to effect movement of the piston 44 against the spring 44b in a direction toward the second chamber 40c, see FIGS. 2 and 14. As pressurized air passes into the first chamber 40b, pressurized air also enters into the second chamber 40c via the orifice 44a in the piston 44.

A cable 46f is interposed between and fixedly connected to the piston 44 and the connector 46b, see FIG. 2. When the piston 44 is in its uppermost position, the cable 46f moves the sensing shoe 38 out of engagement with the moving sheet of paper 12. When the piston 44 is in its lowermost position, the cable 46f limits the distance the sensing shoe 38 can move in a direction away from the housing 40, thereby preventing damage to the diaphragm 46 by overextension from the housing 40.

The fluid supply 47 comprises an air supply 47a, a regulator 47b, a regulator pressure gauge 47c, and a solenoid valve 47d, see FIG. 14. The regulator 47b maintains the pressure of air communicated to the solenoid valve 47d from the air supply 47a at a substantially constant value, e.g., 1.5 bar. The pressure gauge 47c senses and indicates the pressure of the air passing from the regulator 47b to the solenoid valve 47d. The system processor 100 is connected to the solenoid valve 47d and controls its operation. When the solenoid valve 47d is in its "open" position, fluid at approximately the pressure indicated on the gauge 47c passes into the first chamber 40b. When the solenoid valve 47d is in its "closed" position, fluid is prevented from passing into the first chamber 40b.

As noted above, as pressurized air passes into the first chamber 40b, pressurized air also enters the second chamber 40c via the orifice 44a in the piston 44. A gauge 48a is connected to the housing 40 and communicates with the second chamber 40c for sensing and indicating the fluid pressure in the second chamber 40c, see FIG. 14.

An escape valve 48 is associated with the housing 40 and communicates with the second chamber 40c, see FIG. 2. The escape valve 48, when in a partially open position, provides a path for air to exit the second chamber 40c.

Preferably, the escape valve 48 is adjusted while the sensing head 30 is at the factory. Adjustment may be achieved by first fully opening the valve 48 and thereafter slowly closing the valve 48 until the pressure within the second chamber 40c, as read from the gauge 48a, is at a desired value which is a fraction of the value indicated on the pressure gauge 47c. When the escape valve 48 is adjusted in this fashion, an operator can subsequently vary the pressure within the second chamber 40c in a linear fashion via the regulator 47b. For example, if the regulator 47b is adjusted to 1.5 bar, the fluid pressure in the second chamber 40c could be 30 millibar. The regulator 47b should also be set so that the pressure within the first chamber 40b is sufficient to force the piston 44 to its lowermost position. Alternatively, the escape valve 48 may be arranged as a fixed orifice restrictor with an experimentally determined opening.

When the solenoid valve 47d is in its "open" position, fluid entering the first chamber 40b forces the piston 44 to move to its lowermost position where it engages the stop member 45, see FIG. 2. As the piston 44 moves downwardly against the spring 44b, the cable 46f likewise moves downwardly, thereby permitting the sensing shoe 38 to move under the influence of the diaphragm 46 toward the moving sheet of paper 12. When the solenoid valve 47d is in its "closed" position, fluid is prevented from passing into the first chamber 40b and, eventually, the pressure within the first and second chambers 40b and 40c is reduced to atmospheric pressure. As the pressure drops within the first and second chambers 40b and 40c, the spring 44b forces the piston 44 in an upward direction away from the second chamber 40c, causing the cable 46f to move the sensing shoe 38 out of engagement with the sheet of paper 12.

A pressure transducer 48b also communicates with the second chamber 40c. The transducer 48b senses the pressure within the second chamber 40c, generates pressure signals which are indicative of the pressure sensed within the second chamber 40c and transmits those pressure signals to the system processor 100. The system processor 100 monitors the pressure signals received from the transducer 48b and, if an unacceptable pressure level is reached in the second chamber 40c, the processor 100 alerts an operator of the paper making machine 10, closes the solenoid valve 47d to prevent any further air from passing into the first chamber 40b, or takes other appropriate action.

Referring again to FIG. 2, the housing 61 of the second sensing shoe connector and movement controller 62 is fixedly secured to the base plate 54 of the enclosure 52. The housing 61 includes a protruding inner portion 61a which separates first and second inner chambers 61b and 61c from one another. The first chamber 61b communicates with the second chamber 61c via a bore 61d extending through the inner portion 61a.

A piston 64 is positioned within the first chamber 61b for reciprocating movement therein. An orifice 64a extends through the piston 64 to permit fluid to pass therethrough. A stop member 65 is interposed between the piston 64 and the inner portion 61a for limiting the distance the piston 64 can travel toward the second chamber 61c. A first seal 65a seals the stop member 65 to the inner wall 61b' of the first chamber 61b. A second seal 65b seals the stop member 65 to the piston 64 when the piston 64 engages stop member 65. A spring 64b is also interposed between the inner portion 61a and the piston 64 for biasing the piston 64 in a direction away from the second chamber 61c.

A diaphragm 66 extends across an opening 61e in the housing 61 for defining a flexible wall for enclosing the second chamber 61c. The diaphragm 66 is secured in position via a ring plate 66a. Associated with the diaphragm 66 is a rotatable polymeric connector 66b having a lower locking member (not shown) which releasably engages with an opening in a lightweight channel 66d secured to the second sensing shoe 58.

A fluid supply 67 is connected to the housing 61 for supplying pressurized fluid, air in the illustrated embodiment, to the first chamber 61b sufficient to effect movement of the piston 64 against the spring 64b in a direction toward the second chamber 61c, see FIGS. 2 and 14. As pressurized air passes into the first chamber 61b, pressurized air also enters the second chamber 61c via the orifice 64a in the piston 64.

A cable 66f is interposed between and fixedly connected to the piston 64 and the connector 66b. When the piston 64 is in its lowermost position, the cable 66f moves the sensing shoe 58 out of engagement with the moving sheet of paper 12. When the piston 64 is in its uppermost position, the cable 66f limits the distance the sensing shoe 58 can move in a direction away from the housing 61, thereby preventing damage to the diaphragm 66 by overextension from the housing 61.

The fluid supply 67 comprises a regulator 67b which communicates with the air supply 47a, a regulator pressure gauge 67c, and a solenoid valve 67d, see FIG. 14. The regulator 67b maintains the pressure of air communicated to the solenoid valve 67d from the air supply 47a at a substantially constant value, e.g., 1.5 bar. The pressure gauge 67c senses and indicates the pressure of the air passing from the regulator 67b to the solenoid valve 67d. The system processor 100 is connected to the solenoid valve 67d and controls its operation. When the solenoid valve 67d is in its "open" position, air at approximately the pressure indicated on the gauge 67c passes into the first chamber 61b. When the solenoid valve 67d is in its "closed" position, air is prevented from passing into the first chamber 61b.

As noted above, as pressurized air passes into the first chamber 61b, pressurized air also enters the second chamber 61c via the orifice 64a in the piston 64. A gauge 68a is connected to the housing 61 and communicates with the second chamber 61c for sensing the air pressure in the second chamber 61c, see FIG. 14.

An escape valve 68 is associated with the housing 61 and communicates with the second chamber 61c, see FIG. 2. The escape valve 68, when in a partially open position, provides a path for air to exit the second chamber 61c. The escape valve 68 is preferably adjusted in the same manner as escape valve 48.

When the solenoid valve 67d is in its "open" position, fluid enters the first chamber 61b forcing the piston 64 to move toward the second chamber 61c until it engages the stop member 65, see FIG. 2. As the piston 64 moves upwardly against the spring 64b, the cable 66f likewise moves upwardly, thereby permitting the sensing shoe 58 to move under the influence of the diaphragm 66 toward the moving sheet of paper 12. When the solenoid valve 67d is in its "closed" position, fluid is prevented from passing into the first chamber 61b and, eventually, the pressure within both the first and second chambers 61b and 61c is reduced to atmospheric pressure. As the pressure drops within the first and second chambers 61b and 61c, the spring 64b forces the piston 64 in a downward direction away from the second chamber 61c, causing the cable 66f to move the sensing shoe 58 out of engagement with the sheet of paper 12.

A pressure transducer 68b also communicates with the second chamber 61c. The transducer 68b senses the pressure within the second chamber 61c, generates pressure signals which are indicative of the pressure sensed within the second chamber 61c and transmits those signals to the system processor 100. The system processor 100 monitors the pressure signals received from the transducer 68b and, if an unacceptable pressure level is reached in the second chamber 61c, the processor 100 alerts an operator of the paper making machine 10, closes the solenoid valve 67d to prevent any further air from passing into the first chamber 61b, or takes other appropriate action.

The manner in which the caliper measuring system 5 monitors the thickness of a moving sheet of paper 12 will now be described. Referring to FIG. 2, as air is applied to the first chambers 40b and 61b, the pistons 44 and 64 move toward the moving sheet of paper 12 until they engage the stop members 45 and 65. The cables 46f and 66f move with the pistons 44 and 64. Air passing from the first chambers 40a and 61a into the second chambers 40c and 61c causes the diaphragms 46 and 66 to expand toward the moving sheet of paper 12. This, in turn, causes the first and second sensing shoes 38 and 58 to engage the moving sheet of paper 12.

It is noted that each of the diaphragms 46 and 66 has a corrugated shape, see FIGS. 2 and 6. Due to this particular shape, each of the diaphragms 46 and 66 is believed to apply a substantially constant force to its sensing shoe over a wider vertical displacement range than what was previously possible in the prior art.

As noted above, the first sensing shoe 38 comprises a main body 39 formed from first and second layers of boron carbide 39a and 39b and an intermediate layer of ferrite 39c. Ferrite is a magnetically susceptible material. The lower sensing shoe 58 includes an electromagnetic core 60 having a yoke portion 60a and first and second pole portions 60b and 60c. A sensing coil 60f is wound about the yoke portion 60a and is connected to the sensing circuit 90 which, in turn, is connected to the processor 100, see FIG. 16.

The sensing circuit 90 comprises an L-C oscillator 92 which generates pulses of varying frequency, a phase locked loop circuit 94 (commercially available from Exar Integrated Systems, Inc., Sunnyvale, Calif., under the designation XR-2211) which performs a frequency-to-voltage conversion and an output filter 96.

A flux path is established through the core 60, the moving sheet of paper 12 and the layer of ferrite 39c. The gap between the core 60 and the layer of ferrite 39c varies according to the caliper or thickness of the moving sheet of paper 12. As the gap varies, the inductance of the coil 60f changes which, in turn, causes the resonant frequency of the L-C oscillator 92 to change. The phase locked loop circuit 94 converts small frequency changes of the L-C oscillator 92 into a voltage level signal. The resulting voltage level signal is filtered for noise by the output filter 96 and then passed to an analog-to-digital (A/D) converter 100*a* which, in the illustrated embodiment, forms part of the processor 100. With this arrangement, the A/D converter 100*a* is able to take from approximately 1,000 to 5,000 readings with 16 bits resolution per second. The phase locked loop sensing is much faster and gives better resolution than prior art circuits which typically counted oscillator pulses directly.

Figure 17:
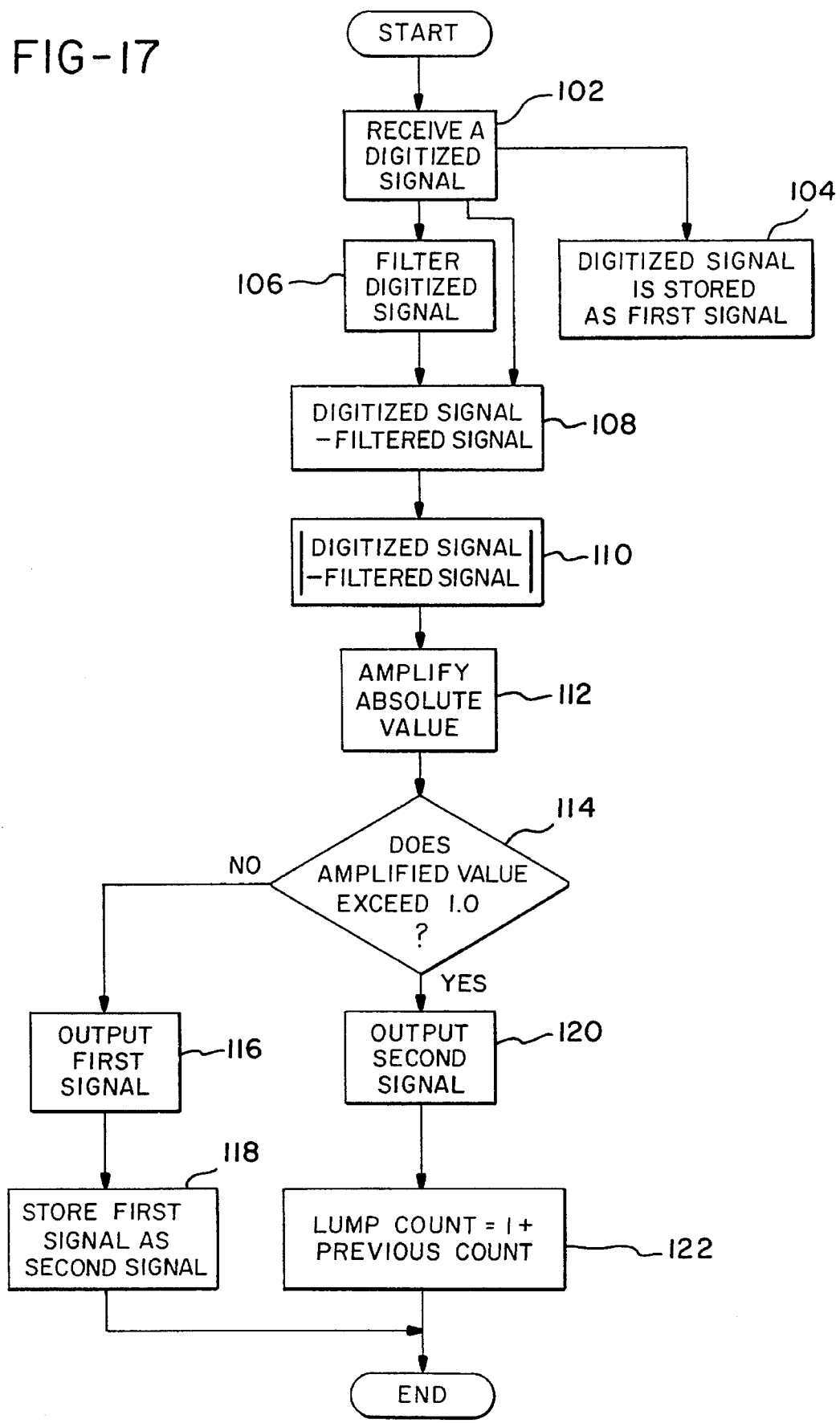
FIG. 17 shows in flow chart form the steps which are performed by the processor of the present invention to remove spikes resulting from one or both of the first and second sensing shoes engaging lumps in a moving sheet of paper.

The processor 100 processes the digitized voltage level signal to remove spikes resulting from one or both of the first and second sensing shoes 38 and 58 engaging lumps in the moving sheet of paper 12. FIG. 17 shows, in flow chart form, the steps which are performed by the processor 100 to remove such spikes.

As shown, the first step 102 is to receive a digitized voltage level signal from the analog-to-digital converter 100*a*. In step 104, the digitized signal is stored as a first signal.

In step 106, the digitized signal is passed through a low pass filter, e.g. 100 Hz, which serves to attenuate spikes resulting from detected lumps. In step 108, a difference is taken between the original digitized voltage level signal and the filtered digitized voltage level signal. In step 110, the absolute value of the difference between the original and filtered signals is determined. In step 112, the absolute value is amplified, e.g. by a gain of 3, to normalize the system. In step 114, the processor 100 determines if the amplified value exceeds a predetermined value, e.g. 1 for a properly normalized system. If no, a lump has not been detected and the current digitized voltage level signal, i.e., the first signal, is output as a distance signal which is used by the processor 100 to determine the thickness of the sheet of paper 12 and the output signal is stored as a second signal, see steps 116 and 118. If yes, a lump has been detected and the second signal, i.e., the previous output signal, is output as the distance signal which is used by the processor 100 for determining the thickness of the moving sheet of paper 12, see step 120. The distance signal output in either step 116 or step 120 is also referred to herein as a lump-corrected signal.

Generally, a lump exists under the first and second sensing shoes 38 and 58 for a very short duration, e.g. 1 or 2 milliseconds. If the sampling of the output from the sensing circuit 90 is performed at approximately 1,000 samples per second, only about one or two successive samples will be erroneous. Thus, the second signal stored in step 118 is chosen since it resulted from a prior, non-erroneous sample, i.e. one generated before the lump passed between the first and second sensing shoes 38 and 58. In the illustrated embodiment, if the first signal is used as the output signal, it is also stored as the second signal to thereby update the second signal. For other embodiments, earlier signals, such as the signal generated before the most recent output signal, may also be used.

Accordingly, spikes representing lumps are effectively removed from the signal used to determine the caliper of the moving sheet of paper 12 to more accurately determine the caliper. However, the number of lumps encountered during caliper measurement is also important and so the processor 100 keeps count of the number of lumps detected, see step 122.

The measurement system 5 of the present invention is also capable of providing a calender baring profile representative of rapid thickness variations along the moving sheet 12 in the direction of movement of the sheet 12. The baring profile is advantageous because it provides a relative indication of vibrations across the calendering rolls 11 of the paper making machine 10. Such information is useful in diagnosing variability in thickness of the sheet 12 that originates in roll vibration problems in the paper making machine 10.

The processor 100 generates the baring profile by determining and plotting an absolute peak-to-peak difference of the thickness readings within each of a plurality of data boxes. Each data box is defined by a plurality of output lump-corrected signals, which are determined by the processor 100 in accordance with the steps set out in FIG. 17.

Figure 18:
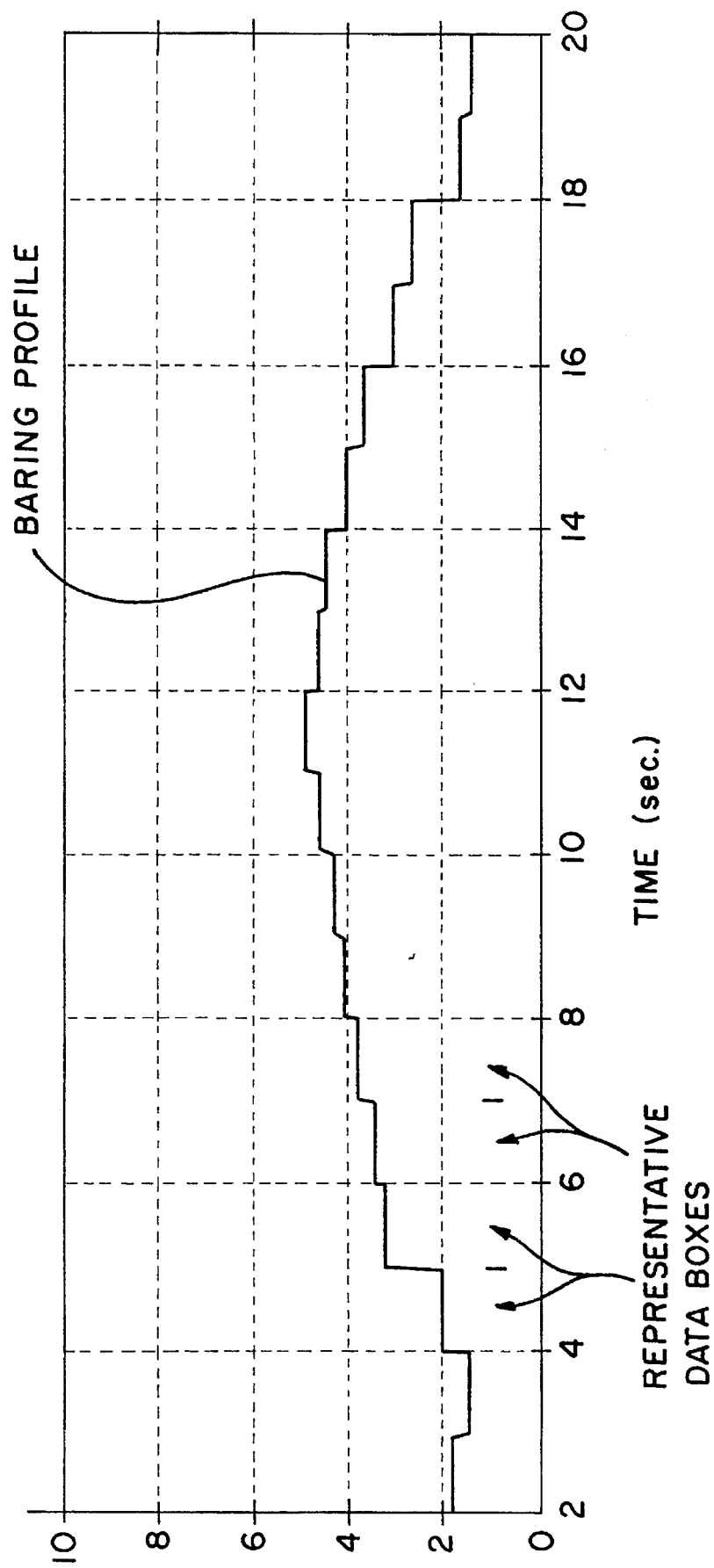
FIG. 18 illustrates an example plot of a baring profile.

The processor 100 determines the absolute peak-to-peak difference for a given data box by identifying maximum and minimum lump-corrected signals within the given data box and taking a difference between the identified maximum and minimum distance signals. The determined difference defines the peak-to-peak difference for the given data box. A plot showing an example baring profile that indicates vibrations that are strongest in the middle of the web and of less amplitude at the edges of the web is shown in FIG. 18. The data box duration for the baring profile can be selected so each box represents desired web travel.

Having described the invention in detail and by reference to preferred embodiments thereof, it will be apparent that modifications and variations are possible without departing from the scope of the invention defined in the appended claims.

What is claimed is:

1. A sheet sensing shoe comprising:

a main body having first and second opposing, generally planar surfaces, first and second opposing ends and first and second opposing sides, said first planar surface being adapted to engage a moving sheet, and said first end including first and second faces which extend between said first and second planar surfaces and converge toward one another to share a common side extending between said first and second planar surfaces.

2. A sheet sensing shoe as set forth in claim 1, wherein said first and second faces are substantially planar.

3. A sheet sensing shoe as set forth in claim 1, wherein said first face intersects a first edge on said first surface at an obtuse angle and intersects a first edge on said second surface at an acute angle, and said second face intersects a second edge on said first surface at an obtuse angle and intersects a second edge on said second surface at an acute angle.

4. A sheet sensing shoe as set forth in claim 3, wherein said first and second edges on said first surface converge at an angle of approximately 90°, and said first and second edges on said second surface converge at an angle of approximately 90°.

5. A sheet sensing shoe as set forth in claim 1, wherein said first face extends inwardly from said first side and said second face extends inwardly from said second side.

6. A sheet sensing shoe as set forth in claim 1, wherein said body is formed from boron carbide.

7. A sheet sensing shoe as set forth in claim 1, further comprising:

an electromagnetic core including a yoke portion and first and second pole portions having respective distal ends which extend into said main body, said first and second pole portions having respective transversely extending cross-sectional areas, each of which exceeds a transversely extending cross-sectional area of said yoke portion; and a sensing coil wound about said yoke portion of said core.

8. A sheet sensing shoe as set forth in claim 1, wherein said body comprises first and second layers of boron carbide and a layer of ferrite which is interposed between said first and second layers of boron carbide.

9. A sheet sensing shoe comprising:

a main body;

an electromagnetic core including a yoke portion and first and second pole portions having respective distal ends which extend into said main body, said first and second pole portions having respective transversely extending cross-sectional areas, each of which exceeds a transversely extending cross-sectional area of said yoke portion; and a sensing coil wound about said yoke portion of said core.

10. A sheet sensing shoe as set forth in claim 9, wherein said electromagnetic core is formed from ferrite.

11. A sheet sensing shoe as set forth in claim 10, wherein said main body is formed from boron carbide.

12. A sheet sensing shoe comprising a main body having first and second layers of boron carbide and a layer of ferrite which is interposed between said first and second layers of boron carbide.

13. A caliper sensing head comprising:

an enclosure;

a sensing shoe; and connector and displacement means associated with said enclosure for flexibly supporting said sensing shoe and for effecting movement of said sensing shoe relative to a moving web over a total range of movement, said connector and displacement means including limit means for limiting movement of said sensing shoe in the direction toward said moving web to a limited range of movement less than said total range of movement.

14. A caliper sensing head as set forth in claim 13, wherein said connector and displacement means further comprises:

a housing having first and second chambers, said first chamber communicating with said second chamber via a bore extending between said first and second chambers;

a reciprocating piston positioned within said first chamber and having an orifice extending therethrough;

means for biasing said piston in a direction away from said second chamber;

supply means connected to said housing for supplying pressurized fluid to said first chamber sufficient to effect movement of said piston against said biasing means in a direction toward said second chamber, said second chamber receiving pressurized fluid which passes through said piston via said orifice;

diaphragm means extending across an opening in said housing for defining a flexible wall for enclosing said second chamber, said diaphragm means acting upon said sensing shoe to effect movement of said sensing shoe relative to said moving web; and escape valve means associated with said second chamber for permitting a limiting quantity of fluid to escape from said second chamber.

15. A caliper sensing head comprising:

an enclosure;

a sensing shoe; and a sensing shoe connector and movement controller associated with said enclosure for flexibly supporting said sensing shoe and for effecting movement of said sensing shoe relative to a moving web over a total range of movement, said sensing shoe connector and movement controller including a shoe movement limiter for limiting movement of said sensing shoe in the direction toward said moving web to a limited range of movement less than said total range of movement.

16. A caliper sensing head as set forth in claim 15, wherein said sensing shoe connector and movement controller further comprises a diaphragm for acting upon said sensing shoe to effect movement of said sensing shoe relative to said moving web.

17. A caliper sensing head as set forth in claim 15, wherein said sensing shoe connector and movement controller further comprises:

a housing having first and second chambers, said first chamber communicating with said second chamber via a bore extending between said first and second chambers;

a reciprocating piston positioned within said first chamber and having an orifice extending therethrough;

a spring for biasing said piston in a direction away from said second chamber;

a fluid supply connected to said housing for supplying pressurized fluid to said first chamber sufficient to effect movement of said piston against said spring in a direction toward said second chamber, said second chamber receiving pressurized fluid which passes through said piston via said orifice;

a diaphragm extending across an opening in said housing for defining a flexible wall for enclosing said second chamber, said diaphragm acting upon said sensing shoe to effect movement of said sensing shoe relative to said moving web; and escape valve means associated with said second chamber for permitting a limiting quantity of fluid to escape from said second chamber.

18. A caliper sensing head as set forth in claim 17, wherein said shoe movement limiter comprises a cable interposed between and connected to said diaphragm and said piston.

19. A caliper sensing head as set forth in claim 17, wherein said fluid supply comprises:

a fluid source;

an input valve for selectively permitting fluid to flow from said fluid source into said first chamber; and a pressure transducer for sensing the pressure in said second chamber and generating pressure signals representative thereof.

20. A caliper sensing head comprising:

an enclosure; and a sensing shoe connector and movement controller associated with said enclosure for flexibly supporting a sensing shoe and for effecting movement of said sensing shoe relative to a moving web, said sensing shoe connector and movement controller comprising:

a diaphragm for acting upon said sensing shoe to effect movement of said sensing shoe relative to said moving web;

a housing having first and second chambers, said first chamber communicating with said second chamber via a bore extending between said first and second chambers;

a reciprocating piston positioned within said first chamber and having an orifice extending therethrough;

a resilient member for biasing said piston in a direction away from said second chamber;

a fluid supply connected to said housing for supplying pressurized fluid to said first chamber sufficient to effect movement of said piston against said resilient member in a direction toward said second chamber, said second chamber receiving pressurized fluid which passes through said piston via said orifice; and, an adjustable escape valve associated with said second chamber for permitting a limiting quantity of fluid to escape from said second chamber.

21. A caliper sensing head as set forth in claim 20, wherein said diaphragm extends across an opening in said housing and defines a flexible wall for enclosing said second chamber.

22. A caliper sensing head as set forth in claim 20, wherein said fluid supply comprises:

a fluid source;

an input valve for selectively permitting fluid to flow from said fluid source into said first chamber;

a pressure transducer for sensing the pressure in said second chamber and generating pressure signals representative thereof.

23. A caliper measuring system for determining the thickness of a moving sheet comprising:

first and second caliper sensing heads having first and second sensing shoes positioned on opposite sides of said moving sheet, said first and second sensing shoes being adapted to engage the opposite sides of said moving sheet;

a gap sensor associated with said first and second sensing shoes for generating distance signals representative of the distance between said first and second sensing shoes and determining the thickness of said moving sheet based upon said distance signals, said gap sensor including an L-C oscillator for generating pulses of varying frequency, a frequency-to-voltage converter for converting frequency changes of said pulses into voltage signals, and a processor for receiving said voltage signals and processing said voltage signals to remove spikes resulting from said first and second sensing shoes engaging lumps in said moving sheet, the resulting processed voltage signals defining said distance signals, and said processor further determining the thickness of said moving sheet from said distance signals.

24. A caliper measuring system as set forth in claim 23, wherein said gap sensor further comprises a filter for filtering noise from said voltage signals before said voltage signals are received by said processor.

25. A caliper measuring system as set forth in claim 23, wherein said processor further counts said spikes to generate a count of lumps sensed in said moving web.

26. A caliper measuring system as set forth in claim 23, wherein said processor further generates a baring profile from said distance signals, said baring profile being representative of rapid thickness variations along said moving sheet in the direction of movement of said sheet.

27. A caliper measuring system as set forth in claim 26, wherein said processor generates said baring profile by determining and plotting a peak-to-peak difference for each of a plurality of data boxes, each data box being defined by a plurality of distance signals, said processor determining the average peak-to-peak difference for a given data box by identifying maximum and minimum distance signals with said given data box and determining a difference between the identified maximum and minimum distance signals, said determined difference defining said peak-to-peak difference for said given data box.

* * * * *